United States Patent
Bodin et al.

(10) Patent No.: US 7,597,411 B2
(45) Date of Patent: Oct. 6, 2009

(54) DEVICE FOR OPERATING A TRACK TENSION WHEEL

(75) Inventors: Anders Bodin, Örnsköldsvik (SE); Mats Vigren, Docksta (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 247 days.

(21) Appl. No.: 11/699,633

(22) Filed: Jan. 30, 2007

(65) Prior Publication Data
US 2007/0182246 A1 Aug. 9, 2007

(30) Foreign Application Priority Data
Feb. 8, 2006 (SE) .................................. 0600274

(51) Int. Cl.
*B62D 55/112* (2006.01)
(52) U.S. Cl. .................... 305/143; 305/145; 305/155
(58) Field of Classification Search .......... 305/124, 305/125, 134, 135, 143, 145, 146, 155; 180/9.21, 180/9.5, 9.52, 9.54, 9.58
See application file for complete search history.

(56) References Cited

U.S. PATENT DOCUMENTS

| | | | |
|---|---|---|---|
| 2,843,431 A | | 7/1958 | Beaufort |
| 3,154,317 A | | 10/1964 | Gustafsson |
| 4,227,748 A | * | 10/1980 | Meisel, Jr. .................. 305/144 |
| 4,949,800 A | * | 8/1990 | Virly .......................... 180/9.21 |
| 5,316,381 A | | 5/1994 | Isaacson et al. |
| 5,368,115 A | * | 11/1994 | Crabb ........................ 180/9.1 |
| 6,062,327 A | * | 5/2000 | Ketting et al. .............. 180/9.52 |
| 6,273,530 B1 | | 8/2001 | Johnson et al. |
| 6,315,374 B1 | * | 11/2001 | Johansson .................. 305/145 |

(Continued)

FOREIGN PATENT DOCUMENTS

EP 1466816 A2 10/2004

(Continued)

OTHER PUBLICATIONS

European Patent Application No. 07101455.9, European Search Report mailed May 26, 2008, 4 pgs.

*Primary Examiner*—Russell D Stormer
(74) *Attorney, Agent, or Firm*—Schwegman, Lundberg & Woessner, P.A.

(57) ABSTRACT

The invention relates to a device for operating a track tension wheel on a tracked vehicle. The device comprises two operating cylinders, a pivoting cylinder (38, 48) for pivoting a tension wheel arm (10) that carries a tension wheel, and a tensioning cylinder (28, 30) for changing the distance between the center (25) of the tension wheel and the center of rotation (12) of the tension wheel arm. The tensioning cylinder (28, 30) is pivotally connected to a pivoting link arm (36), which link arm is arranged to be stationary in a first phase of a pivoting upward movement of the tension wheel arm (10) from a lowered position and to pivot around its connection to the link arm (36). In a second phase of the upward pivoting movement, a lug (50) on the tension wheel arm (10) is arranged to engage with the link arm (36) to cause the tensioning cylinder (28, 30) to be pivoted around the connection of the link arm (36) to the attachment (18) during a continued upward pivoting movement of the tension wheel arm (10).

14 Claims, 4 Drawing Sheets

U.S. PATENT DOCUMENTS

| | | |
|---|---|---|
| 7,093,914 B2 | 8/2006 | Eriksson et al. |
| 2004/0207258 A1 | 10/2004 | Eriksson et al. |

FOREIGN PATENT DOCUMENTS

| | | |
|---|---|---|
| FR | 1401309 | 6/1965 |
| SE | 0301046-9 | 10/2004 |
| SE | 525073 | 11/2004 |
| WO | WO-99/17978 A1 | 4/1999 |

\* cited by examiner

DEVICE FOR OPERATING A TRACK TENSION WHEEL

RELATED APPLICATION

This application claims priority under 35 U.S.C. 119 to Sweden Application No. 0600274-5, filed Feb. 8, 2006, which application is incorporated herein by reference and made a part hereof.

BACKGROUND OF THE INVENTION

1. Field of the Invention

The invention relates to devices for operating a track tension wheel on a tracked vehicle, and relates more specifically to a device of the type that comprises a tension wheel arm that has an axis of rotation at a first end, around which the arm can be pivoted in relation to the vehicle by means of a first drive member, which tension wheel arm carries the tension wheel at its other end, via a rocker arm that is mounted on the tension wheel arm in such a way that it can pivot around a spindle, and a second drive member for changing the distance between the central axis of the tension wheel and the center of rotation of the tension wheel arm by pivoting the rocker arm in relation to the tension wheel arm, in order thereby to adjust the tension of, or alternatively to replace, the vehicle's drive track that is running over the tension wheel, with the first drive member having a first end that engages with the tension wheel arm at a distance from the center of rotation of the tension wheel arm in such a way that it can pivot, and a second end that is connected to a first attachment in such a way that it can pivot, whereas the second drive member has a first end that is pivotally connected to a part that is connected to the rocker arm.

2. Description of the Related Art

In order to change and optimize the driving characteristics of a tracked vehicle to suit the surface upon which it is being driven, varying the vertical position of the tension wheel on the tracked vehicle between an upper position, in which the vehicle can be driven on a hard firm surface, and a lowered position, in which the vehicle can be driven on a soft yielding surface such as deep snow, soft ground or marshland, has previously been proposed. At the same time, it is desirable to keep the track tension somewhat lower when the tension wheel is raised, in order to have less wear on the track when driving on a hard surface, and to keep the track tension increased somewhat when the tension wheel is lowered, in order to reduce the specific ground pressure when driving on a soft surface.

A device of essentially the type described in the introduction that makes this possible is already known through FR 1 401 309 (see FIGS. 6 and 7). This device is not designed to be able to achieve an automatic tensioning of the drive track during the final phase of the lowering of the tension wheel arm. As a result of its design, the operating device for the tension wheel is bulky and can be easily damaged by external objects. In addition, on this device, the operating cylinder for pivoting the tension wheel arm upwards and downwards is permanently attached to the vehicle in such a way that it does not allow rapid springing movements of the tension wheel arm, when, for example, the tension wheel drives over a projecting object on the ground.

In SE 0301046-9 (SE 525 073 C), a device is also known for operating a track tension wheel on a tracked vehicle, which device has a tension wheel arm that can be adjusted telescopically in length, and achieves an automatic lengthening of the arm when this is lowered, in order at the same time to obtain a required tensioning of the associated drive track that runs around the tension wheel. The tension wheel arm is operated by two hydraulic cylinders that are mounted on the vehicle itself in such a way that they can pivot. As the hydraulic cylinders are mounted on the vehicle outside the actual tension wheel arm, the mechanical connections between the hydraulic cylinders and the arm and between the hydraulic cylinders and the eccentric mechanism can be exposed to external forces, in addition to which seals need to be arranged to protect the cylinders from the ingress of dirt. In addition, under certain circumstances, the automatic lengthening of the arm when it is pivoted down can create too strong a tension in the drive track in a horizontal position of the arm. In order to enable there to be springing movements of the arm when driving on uneven surfaces, one of the two cylinders can act as a shock absorber, by oil in the cylinder being allowed to flow through an associated regulator.

SUMMARY OF THE INVENTION

A primary object of the present invention is to achieve an operating device for a track tension wheel on a tracked vehicle, where the operating device is very compact and makes it possible to incorporate the drive members (the hydraulic cylinders) in the tension wheel arm in a way that protects them, with the operating device, in addition, making possible an automatic changing of the distance between the center of the tension wheel and the center of rotation of the tension wheel arm during pivoting upwards and downwards of the tension wheel arm, only over a lower pivoting range, while the distance between centers remains essentially constant over an upper pivoting range, while, at the same time, it is possible to prevent the drive track from being tensioned too much in an essentially horizontal position of the tension wheel arm. For this purpose, the operating device according to the invention has the features that are described in Claim 1.

An additional object of the invention is to achieve an operating device of the type in question that enables there to be a rapid inward and outward springing movement of the tension wheel arm. For this purpose, the first drive member for pivoting the tension wheel arm upwards or downwards, preferably a hydraulic cylinder, can be urged by a mechanical spring towards a first position in a non-rigid way, in which position the tension wheel arm assumes a lowered position, while the first drive member can be moved in its entirety and in a locked state towards a position that is displaced backward in relation to the first position, against the action of the tensioning force of the spring. Alternatively, the first drive member can be compressed in a non-rigid way by the action of a hydraulic or pneumatic spring unit, that comprises a pressure accumulator connected to the drive member.

Additional characteristics and specific components of the device according to the invention are described in the subsidiary claims and are apparent from the following detailed description, with reference to the attached drawings.

DETAILED DESCRIPTION OF THE INVENTION

Figure 1:
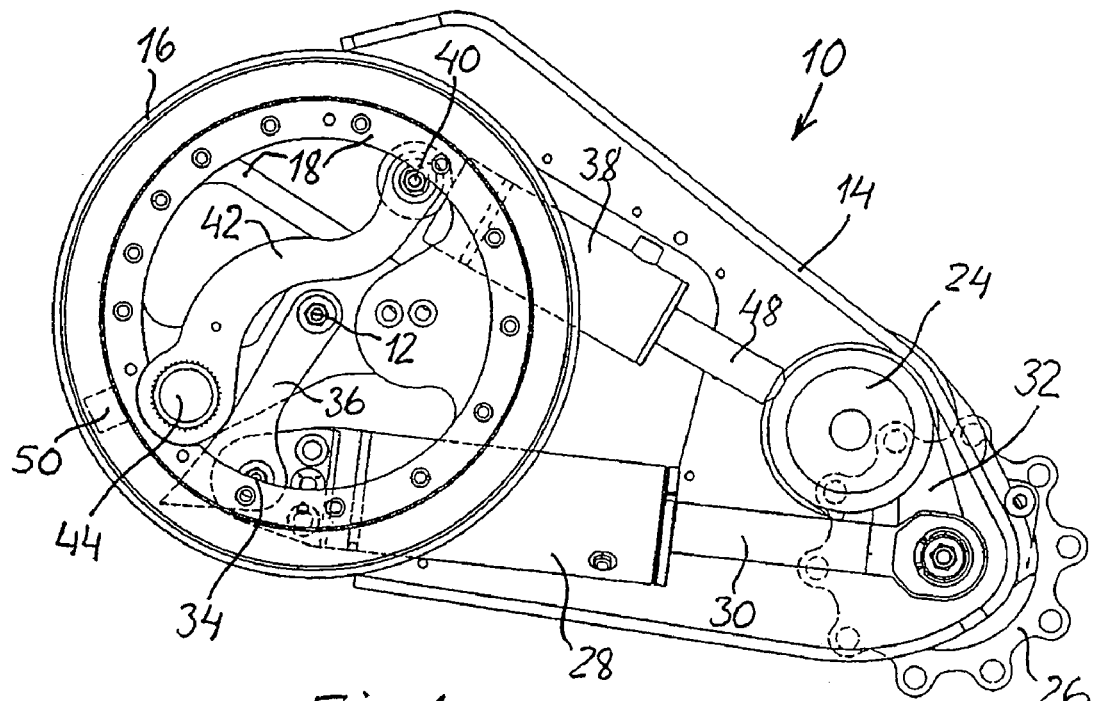
FIG. 1 is a side view of a tension wheel arm according to the invention in a fully lowered position and with the tension wheel projected maximally from the center of rotation.

A tension wheel arm according to the invention is designated in general by 10 in the drawings. Such an arm 10 is mounted in such a way that it can pivot around a center of rotation 12 on each side of a rear part of a tracked vehicle (not shown) in order to tension an endless drive track on the left and right sides of the vehicle by means of a tension wheel (not shown) mounted on the outer end of the arm, and also to move the tension wheel between a raised position and a lowered position in the track adjusting arrangement to obtain different running characteristics for the vehicle depending upon the surface on which the vehicle is being driven.

Figure 4:
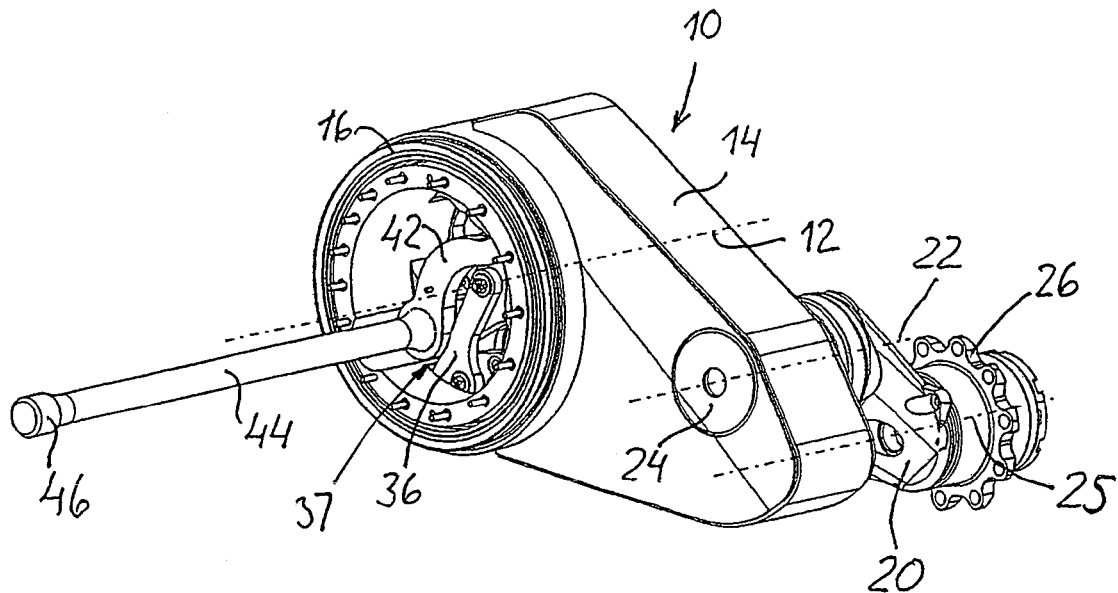
FIG. 4 is a perspective view of the tension wheel arm according to the invention, viewed from the inside of the arm.

Each tension wheel arm 10 comprises a tension wheel unit in the form of a rigid housing 14 that can house most of the components of the tension wheel arm 10. A hub part 16 of the housing 14 is mounted in such a way that it can pivot around the central axis 12 on an attachment designated in general by 18, that is designed to be permanently attached to the respective side of the rear part of the tracked vehicle. At an outer end of the housing 14 (the arm 10), there is a rocker arm 20 (see FIG. 4) that is mounted in such a way that it can pivot around an axis of rotation 22 through a spindle 24. On its outer end, the rocker arm 20 carries a tension wheel attachment 26 that can rotate around an axis of rotation 25, to which attachment a track tension wheel (not shown) is mounted.

Figure 7:
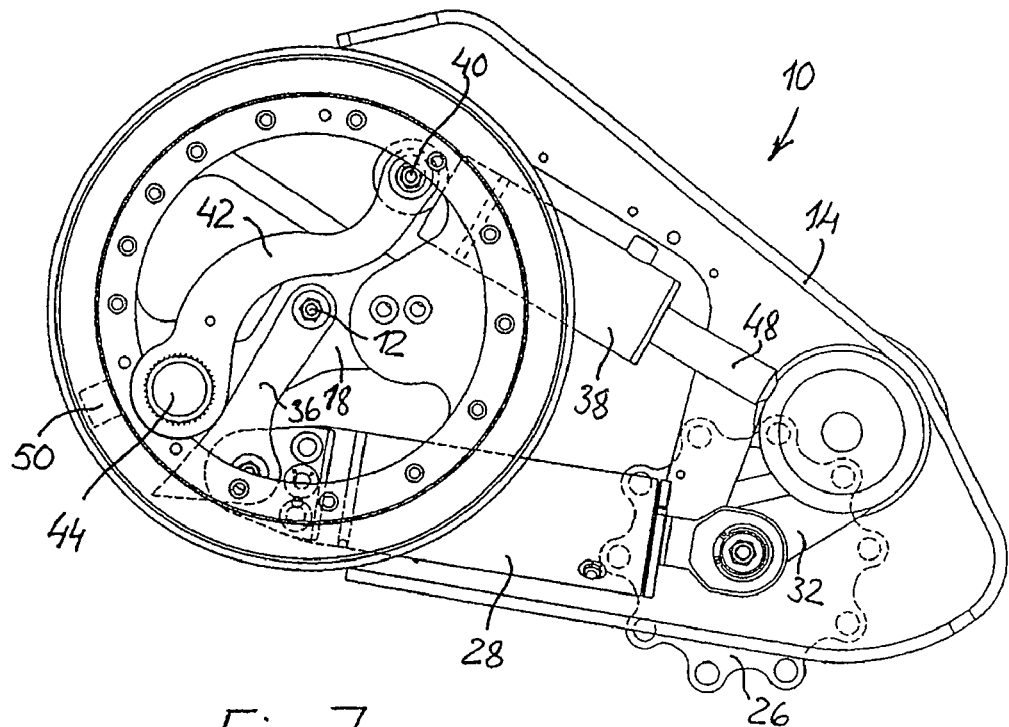
FIG. 7 is a side view of the tension wheel arm according to the invention in a position in which the tension wheel is maximally retracted towards the center of rotation of the tension wheel arm.

In order to be able to adjust the tension of the drive track while the vehicle is stationary or during operation of the vehicle, and to make it possible to replace the drive track, it must be possible to move the tension wheel in such a way that the distance from the center of the tension wheel to the axis of rotation 12 of the arm 10 (the housing 14) can be adjusted. For this purpose, the tension wheel arm 10 has a tensioning drive member mounted inside the housing 14 that acts in a linear direction, here in the form of a hydraulic cylinder 28 (below called the "tensioning cylinder"), that has a piston rod 30 that is connected to a crank 32 in such a way that it can pivot, which crank is in turn connected to the rocker arm 20 in such a way that it moves the rocker arm, by means of the spindle 24 that can rotate around the axis of rotation 22. The tensioning cylinder 28 is attached at 34 to an outer end of a second link arm 36 in such way that it can pivot, an inner end of which link arm is preferably mounted on the attachment 18 in such a way that it can pivot around the axis of rotation 12 of the arm 10. In the position shown in FIG. 1, the link arm 36 engages a retainer 37 (FIG. 4) forming a stop member for the link arm 36 and for the tensioning cylinder 28. The link arm 36 is preferably designed as two parallel link arms, that link the attachment 18 and the cylinder attachment at 34. By activating the tensioning cylinder 28, the piston rod 30 can thus pivot the tension wheel mounted on the attachment 26, via the crank 32 and the rocker arm 20, in a direction outwards away from the axis of rotation 12 of the arm 10 (FIG. 1) to tension the drive track, or in a direction inwards towards the axis of rotation 12 (FIG. 7) to reduce the tension in the drive track or to enable the drive track to be replaced.

In addition, in order to be able to pivot the tension wheel arm 10 around the axis of rotation 12 between a lowered position (FIG. 1) and a raised position (FIG. 3) to suit the surface upon which the vehicle is being driven, an additional, pivoting drive member that acts in a linear direction in the form of a hydraulic cylinder 38 (below called a "pivoting cylinder") is arranged inside the housing 14 of the arm 10. One end of the pivoting cylinder 38 is attached at 40 to one end of a first link arm 42 in such a way that it can pivot, the other end of the link arm being attached to a torsion rod 44 in such a way that it can pivot, the opposite end 46 of the torsion rod (FIG. 4) being designed to be permanently attached to the vehicle. This link arm 42 is also preferably designed as two parallel link arms, that link the cylinder attachment at 40 and the attachment 18. The pivoting cylinder 38 has a piston rod 48, the outer end of which engages, in such a way that it can pivot, with a part that is attached to the housing 14 at a distance from the axis of rotation 12 of the arm. This part can suitably consist of a spindle 24 that connects the crank 32 to the rocker arm 20 in such a way that the crank moves the rocker arm.

Figure 2:
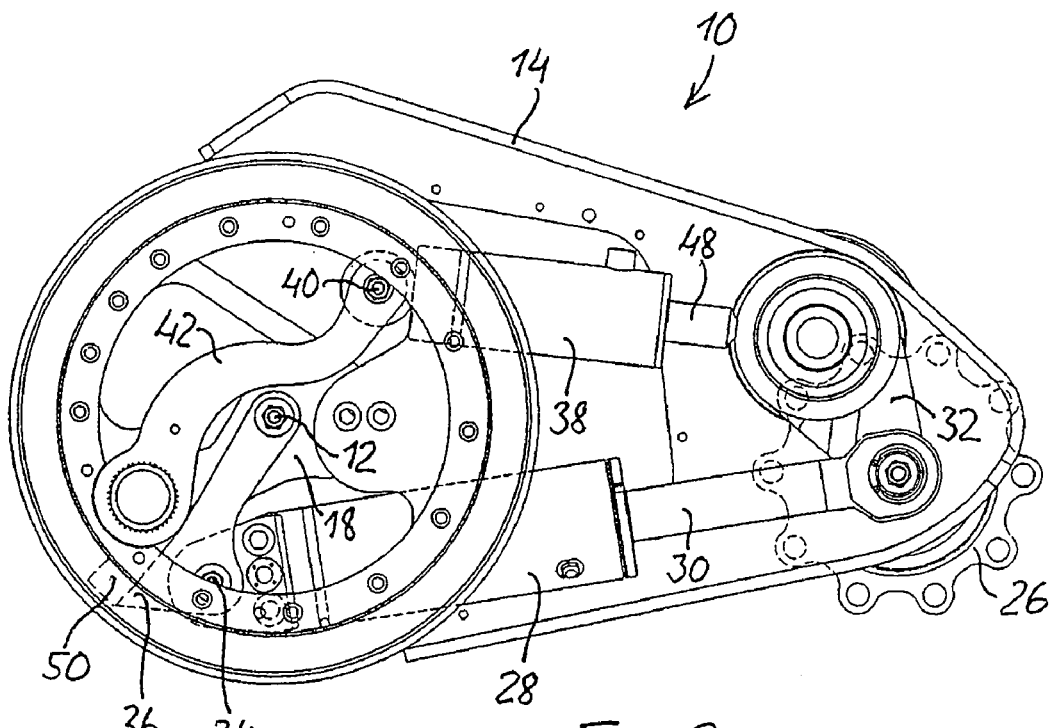
FIG. 2 is a side view of the tension wheel arm according to the invention in a middle position.
Figure 3:
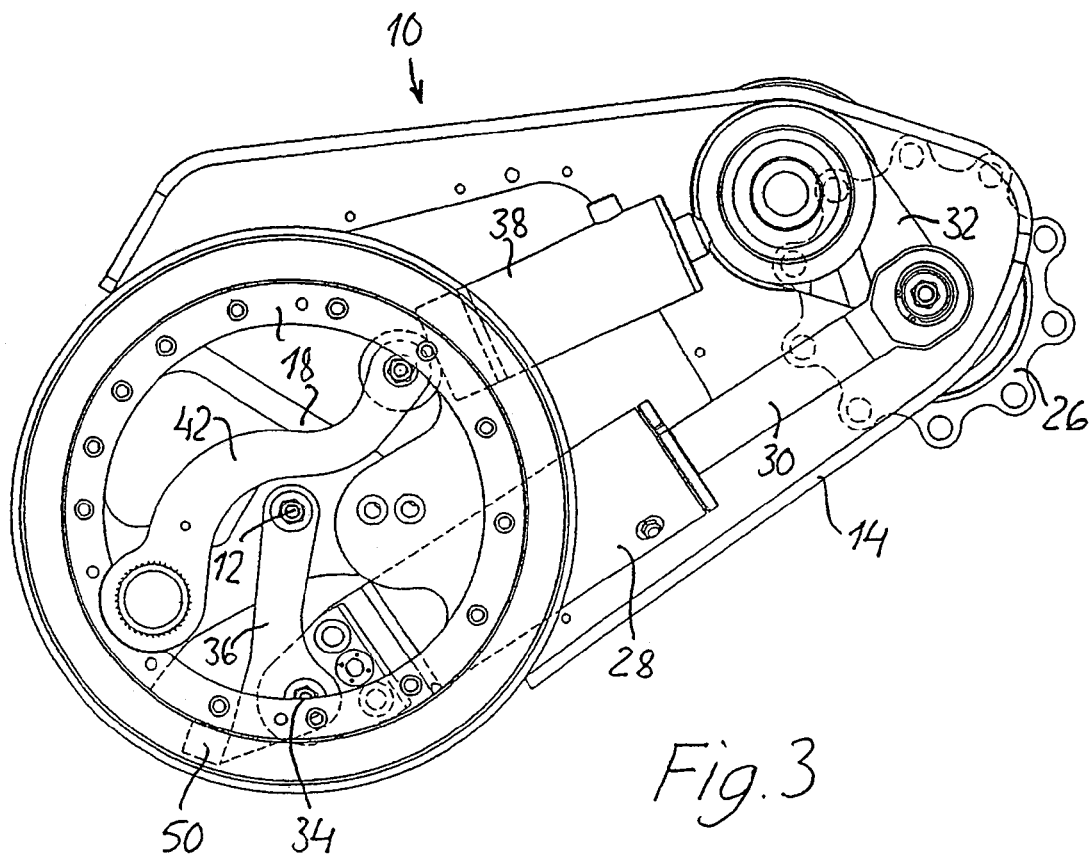
FIG. 3 is a side view of the tension wheel arm according to the invention in a fully raised position.

As shown in FIG. 1, on the inside of the hub 16 of the housing 14 there is a lug 50 that, in the fully lowered position of the arm 10, is at a distance in the peripheral direction from a radially outer end of the link arm 36. When the pivoting cylinder 38 is activated in an initial upward rotation of the arm 10 from the position in FIG. 1, the piston rod 48 is retracted into the cylinder 38, whereupon the lug 50 moves in a direction towards the outer end of the link arm 36. The tensioning cylinder 28 thereby rotates around the point 34, while at the same time it is kept inactivated, that is locked so that the cylinder part 28 and the piston rod 30 do not move in relation to each other, which, due to the point of attachment 34 of the tensioning cylinder 28 not lying at the center of rotation 12 of the arm, means that the distance between the axis of rotation 12 of the arm 10 and the central axis 25 of the tension wheel is decreased somewhat, with the result that a particular required reduction of the track tension takes place during this pivoting-upward phase. As a result of the lug 50 coming into contact with the outer end of the link arm 36 (see FIG. 2), the whole tensioning cylinder 28 is caused to rotate around the axis of rotation 12 of the link arm 36 and of the tension wheel arm 10, which means that during the continued upward rotation of the arm 10 to the upper end position as shown in FIG. 3, the distance between the center 25 of the tension wheel and the center of rotation 12 of the arm 10 is kept constant. Depending upon the position of the axis of rotation 12 of the arm 10 in relation to the upper and lower running parts of the vehicle's drive track, the tension of the respective drive tracks can be kept within the required values, when the tension wheel moves between its upper and lower end positions.

Figure 5:
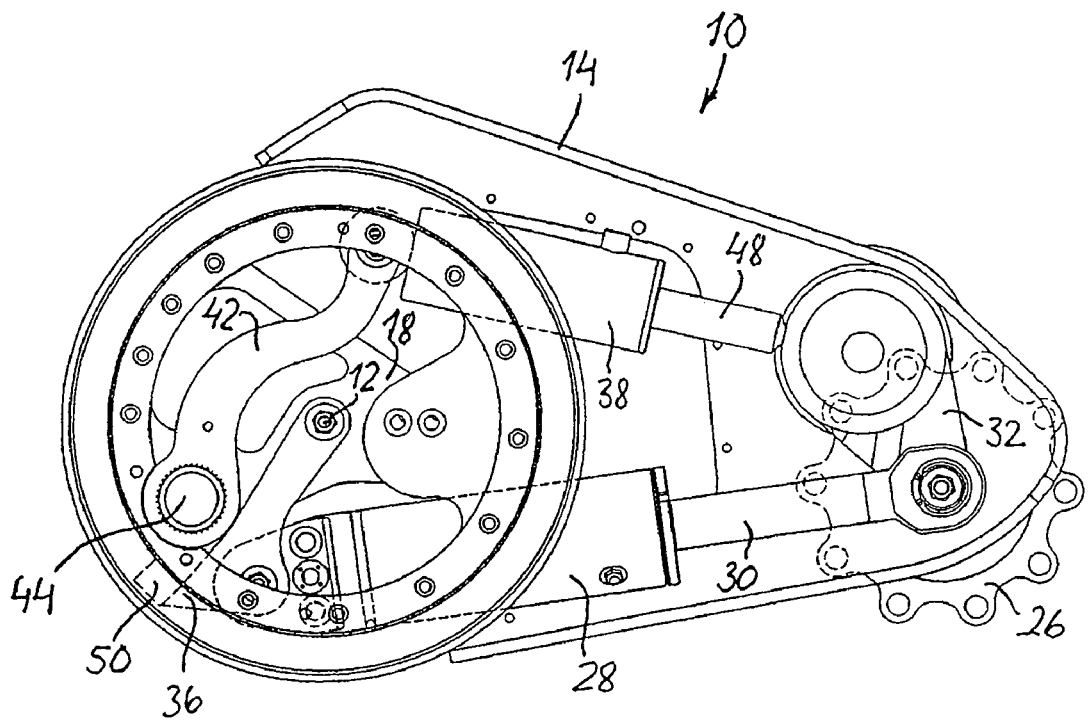
FIG. 5 is a side view of the tension wheel arm according to the invention in a partially sprung-inward position.
Figure 6:
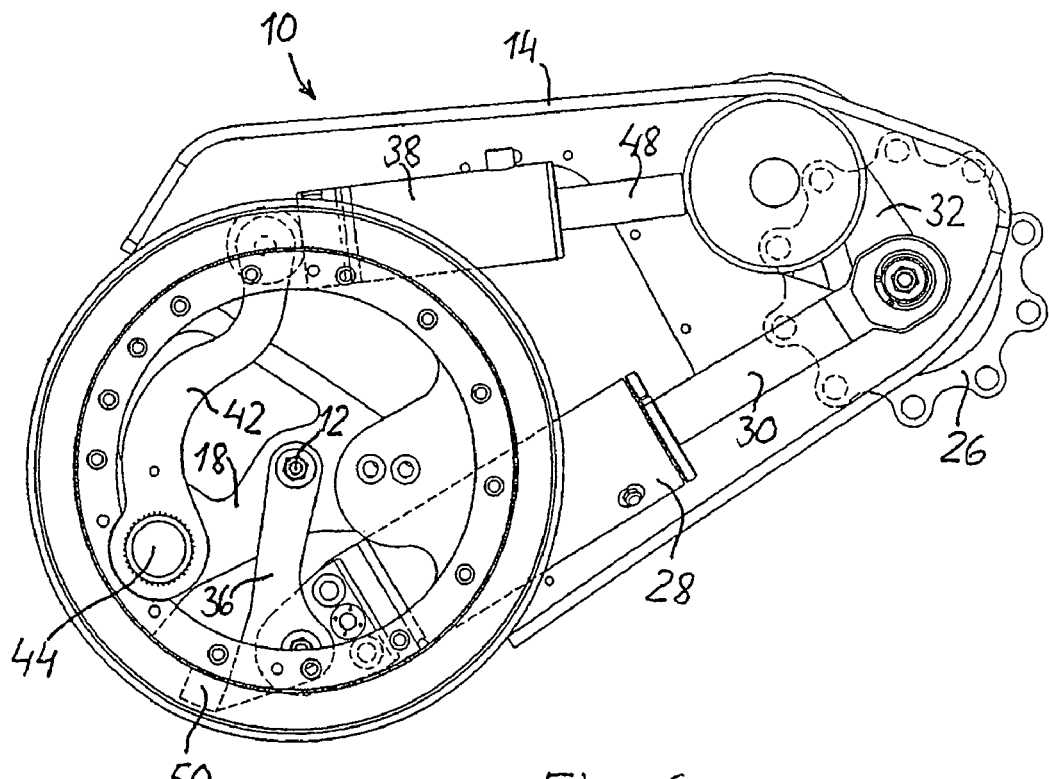
FIG. 6 is a side view of the tension wheel arm according to the invention in a maximally sprung-inward position.

When driving the tracked vehicle on a relatively soft surface, the track tension wheel is set in its lower operating position according to FIG. 1. In this operating position, when the pivoting cylinder 38 and the tensioning cylinder 28 are normally kept hydraulically locked, the pivoting cylinder 38 can be pivoted around the center of rotation of the torsion rod 44 via the link arm 42 in order to allow rapid individual inward and outward springing movements of the tension wheel arm 10 when driving over uneven ground or over projecting objects. This is apparent by a comparison between FIG. 5, that shows a partially sprung-inward position of the arm 10, and FIG. 6 that shows a maximally sprung-inward position. A springing inward of the arm 10 thus takes place against the action of the spring tensioning force of the torsion rod 44 on the pivoting cylinder 38. This spring force is, however, sufficiently large to enable the pivoting cylinder 38 to remain essentially stationary in a retracted end position in the driving direction during a pivoting downward or upward of the arm 10 as shown in FIGS. 1-3 and thereby to withstand the torque that the drive track exerts on the link arm 42 via the rocker arm 20, the piston rod 48 and the cylinder 38.

Due to the non-rigid attachment of the pivoting cylinder 38 in relation to the vehicle and the tension wheel arm 10 by means of the torsion rod 44 and the link arm 42, rapid inward and outward springing movements of the arm 10 are made possible. In addition, the attachment of the tensioning cylinder 28 to the link arm 36 and the central mounting of this in the attachment 18 on the arm 10 and the engagement between the lug 50 and the outer end of the link arm 36 that brings about a rotation during a part of the pivoting movement of the arm 10 around the axis 12, result in both a constant distance and changes to the distance between the axis of rotation 12 of the arm and the central axis 25 of the tension wheel in such a way that this distance between centers is increased during a later phase of the lowering movement or reduced during an initial phase of an upward pivoting movement of the tension wheel arm 10. By this means, it is thus possible to achieve a required automatic tensioning of the vehicle's drive track during the later part of the lowering of the arm 10.

Figure 8:
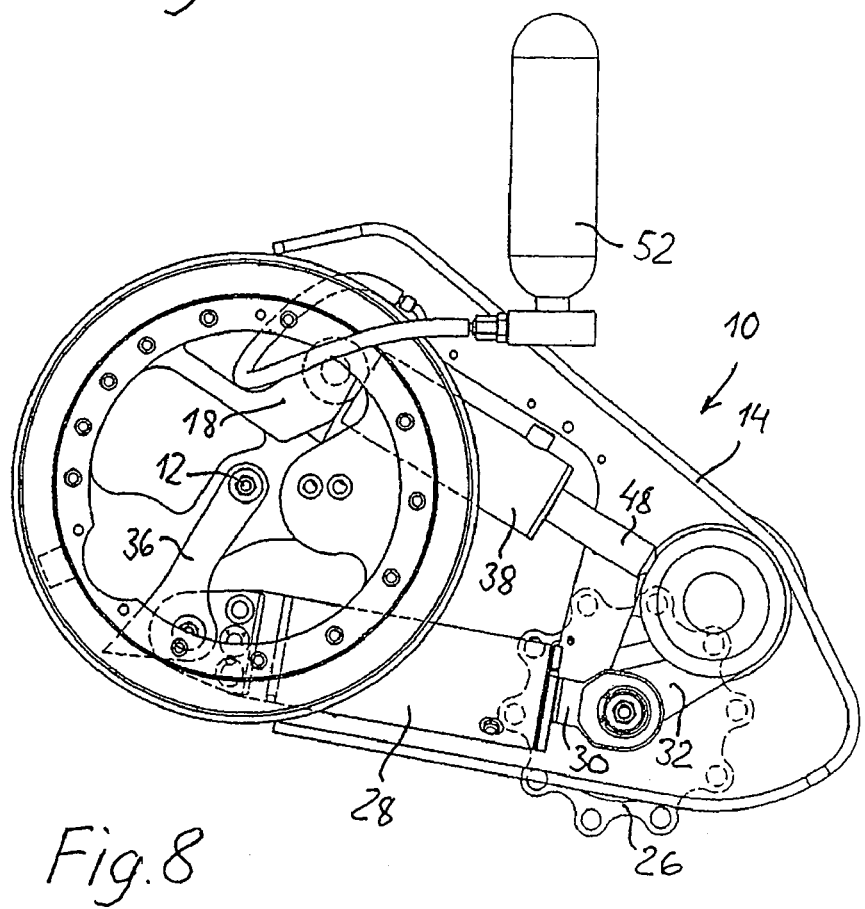
FIG. 8 is a side view of a tension wheel arm according to a second embodiment of the invention in a lowered position.

As an alternative solution for making possible rapid inward and outward springing movements of the tension wheel arm 10, instead of the mechanical tensioning by means of a torsion rod 44 or the like, where the whole locked pivoting cylinder 38, 48 is moved forwards in the normal driving direction of the vehicle by the action of the pivoting link arm 42, the pivoting cylinder 38 can be constructed so that it can be compressed in a non-rigid way, such as a hydraulic or pneumatic spring unit, that can comprise an arrangement with a pressure-controlled overflow valve (not shown) in combination with a hydraulic/pneumatic accumulator 52, as shown schematically in FIG. 8. Accordingly, the link arm 42 can be omitted and the pivoting cylinder 38, 48 can be attached to a stationary point on the attachment 18 in such a way that it can pivot.

By means of the invention, a very compact design of the tension wheel arm 10 is achieved, in which the drive devices or operating cylinders 28, 30 and 38, 48 can be mounted inside the rigid housing 14 of the arm 10 in such a way that they are protected.

Even though the hydraulic cylinders 28 and 38 are shown in the described embodiment as drive devices for changing the length and angular position of the tension wheel arm 10, it is of course possible within the framework of the invention to utilize other linear or rotating drive devices to achieve an equivalent operating function. Examples of these can be pneumatic cylinders, ball screws, electrical or hydraulic motors with toothed wheel gears or the like.

In addition, other mechanical spring devices can be utilized instead of the torsion rod 44 and the link arm 42 for tensioning the pivoting cylinder 38 towards an end position, in which the tension wheel arm 10 can pivot between a raised position and a lowered position by activation of the pivoting cylinder 38. For example, a suitably designed compression spring could be arranged to act on the end of the pivoting cylinder 38 at 40 and thereby have an equivalent function to make possible rapid inward and outward springing movements of the tension wheel arm 10.

What is claimed is:

1. A device for operating a track tension wheel on a tracked vehicle, comprising:
   - a tension wheel arm that has an axis of rotation at a first end, around which the arm can be pivoted in relation to the vehicle by means of a first, pivoting drive member, the tension wheel arm including the tension wheel at its other end attached to a rocker arm that is pivotably mounted on a spindle of the tension wheel arm; and
   - a second, tensioning drive member for changing the distance between the central axis of the tension wheel and the center of rotation of the tension wheel arm by pivoting the rocker arm in relation to the tension wheel arm, in order thereby to adjust the tension of, or alternatively to replace, a vehicle drive track that is running over the tension wheel,
   - said first drive member having a first end that engages with the tension wheel arm at a distance from the center of rotation of the tension wheel arm in such a way that it can pivot, and a second end that is pivotally connected to a first attachment,
   - said second drive member having a first end that is pivotally connected to the rocker arm through a crank;
   - wherein a second end of the second drive member is pivotally connected to a first pivoting link arm, which has a first end that is pivotally connected to a second attachment configured to be fixated to the vehicle, said first link arm being arranged, in a first position thereof, to engage with a retainer at the second attachment, in order to allow the second drive member to pivot around its connection to the first link arm in a first phase of the pivoting or springing upward movement of the tension wheel arm from a fully lowered position; and a lug on a hub of the tension wheel arm is arranged to engage with the first link arm in a second continued phase of the pivoting or springing upward movement of the tension wheel arm, to cause the second drive member to pivot around the connection of the first link arm to the second attachment during the continued pivoting or springing upward movement of the tension wheel arm.

2. The device according to claim 1, wherein the first end of the first link arm is pivotally connected to the second attachment at the axis of rotation of the tension wheel arm.

3. The device according to claim 2, wherein the second attachment is located inside the hub of the tension wheel arm.

4. The device according to claim 1, wherein the crank is rigidly connected to the spindle that carries the rocker arm.

5. The device according to claim 1, wherein the first drive member is pivotable within the tension wheel arm to allow inward and outward springing movements of the tension wheel arm.

6. The device according to claim 5, wherein the first drive member is urged by a mechanical spring device towards a first position in a non-rigid way, in which position the tension wheel arm assumes a lowered position, said first drive member being able be moved in its entirety and in a locked state towards a position that is displaced backward in relation to the first position, against the action of the tensioning force of the mechanical spring device.

7. The device according to claim 6, wherein the second end of the first drive member is pivotally connected to the first attachment through a second pivoting link arm.

8. The device according to claim 7, wherein the second link arm has a first end that is pivotally connected to the second end of the first drive member, and a second end that is pivotally connected to the first attachment.

9. The device according to claim 8, wherein the mechanical spring includes a torsion rod connected to the second end of the second link arm, which torsion rod is arranged to be attached to a fixed support on the vehicle.

10. The device according to claim 7, wherein the second end of the second link arm is pivotable about the axis of rotation of the tension wheel arm.

11. The device according to claim 1, wherein the first and second drive members include hydraulic compression cylinders.

12. The device according to claim 11, wherein the first drive member can be compressed in a non-rigid way by the action of a hydraulic or pneumatic spring unit, that comprises a pressure accumulator connected to the first drive member.

13. The device according to claim 1, wherein the first end of the first drive member is pivotally connected to the spindle.

14. The device according to claim 1, wherein the tension wheel arm is designed with a self-supporting housing in which the first and the second drive members are contained and arranged essentially overlapping each other.

* * * * *